United States Patent
Aimo Boot

(10) Patent No.: US 11,946,287 B2
(45) Date of Patent: Apr. 2, 2024

(54) VEHICLE PROVIDED WITH A SECURITY SYSTEM FOR THERMAL RUNAWAY

(71) Applicant: IVECO S.p.A., Turin (IT)

(72) Inventor: Marco Aimo Boot, Caselle Torinese (IT)

(73) Assignee: IVECO S.P.A., Turin (IT)

(*) Notice: Subject to any disclaimer, the term of this patent is extended or adjusted under 35 U.S.C. 154(b) by 1063 days.

(21) Appl. No.: 16/811,957

(22) Filed: Mar. 6, 2020

(65) Prior Publication Data
US 2020/0291712 A1 Sep. 17, 2020
US 2021/0254392 A2 Aug. 19, 2021

(30) Foreign Application Priority Data
Mar. 11, 2019 (IT) .......................... 102019000003499

(51) Int. Cl.
*B60K 1/04* (2019.01)
*B60L 50/64* (2019.01)
(Continued)

(52) U.S. Cl.
CPC ............ *E05B 63/0065* (2013.01); *B60K 1/04* (2013.01); *B60L 50/64* (2019.02); *E05B 81/64* (2013.01);
(Continued)

(58) Field of Classification Search
None
See application file for complete search history.

(56) References Cited

U.S. PATENT DOCUMENTS 8,277,965 B2 * 10/2012 Hermann ............ H01M 10/653
429/185
8,511,237 B2 * 8/2013 Morita .................. B60L 3/0046
105/51

(Continued)

FOREIGN PATENT DOCUMENTS

CN 107512179 * 12/2017
DE 2264267 7/1973
(Continued)

OTHER PUBLICATIONS

Italian Search Report for Italian Application No. IT 201900003499, dated Nov. 8, 2019, 8 pages.

*Primary Examiner* — Joseph D. Pape
(74) *Attorney, Agent, or Firm* — KLINTWORTH & ROZENBLAT IP LLP

(57) ABSTRACT

A vehicle includes a plurality of walls defining a volume adapted to house passengers and/or merchandise and at least one electric battery pack to supply energy for the operation of the vehicle, said at least one electric battery pack being housed in a respective seat made in at least one of the walls and defining with the latter a housing volume comprising at least one cover configured to assume a first operating position in which the volume communicates with the outside environment and a second operating position in which the volume is isolated from the outside environment. The vehicle also includes a security system configured to enable the covers to move from the first operating position to the second operating position when a temperature of the electric battery pack and/or a temperature inside the volume exceed/s a pre-set threshold temperature value.

10 Claims, 5 Drawing Sheets

(51) Int. Cl.
  *E05B 63/00*  (2006.01)
  *E05B 81/64*  (2014.01)
  *H01M 50/249* (2021.01)
  *H01M 50/262* (2021.01)
  *H01M 50/271* (2021.01)
  *B60L 58/26*  (2019.01)

(52) U.S. Cl.
  CPC ....... *H01M 50/249* (2021.01); *H01M 50/262* (2021.01); *H01M 50/271* (2021.01); *B60K 2001/0405* (2013.01); *B60L 58/26* (2019.02); *E05B 2063/0091* (2013.01); *E05Y 2900/506* (2013.01); *H01M 2220/20* (2013.01)

(56) References Cited

U.S. PATENT DOCUMENTS

| | | | |
|---|---|---|---|
| 10,008,752 B1 * | 6/2018 | Chan | H01M 10/6567 |
| 10,998,587 B2 * | 5/2021 | Walker | H01M 10/6563 |

FOREIGN PATENT DOCUMENTS

| | | | | |
|---|---|---|---|---|
| DE | 102017009416 | | 11/2018 | |
| EP | 0314201 | | 5/1989 | |
| GB | 2260793 | | 4/1993 | |
| GB | 2537859 | * | 2/2019 | |
| JP | 2001310733 | | 11/2001 | |
| WO | WO-2018166217 A1 | * | 9/2018 | ............ B60L 3/0046 |

* cited by examiner

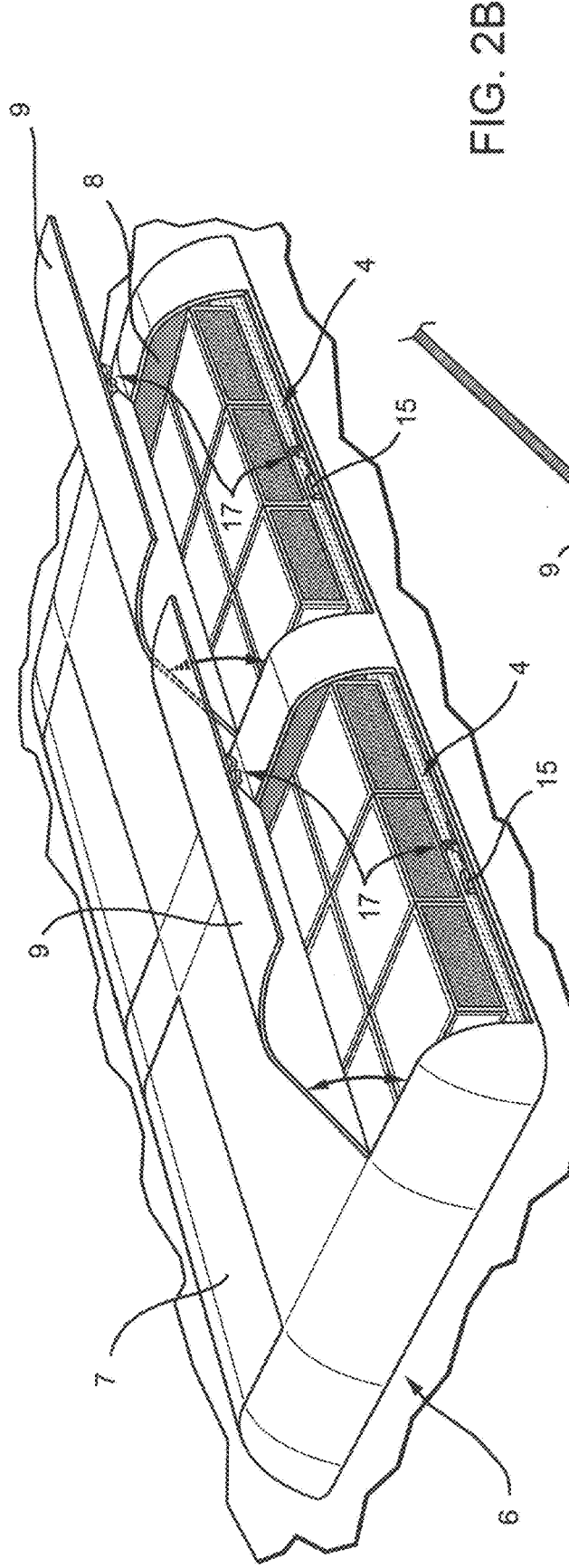
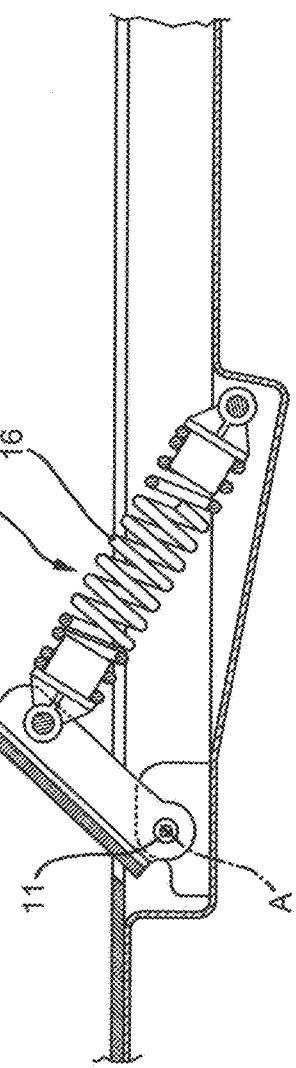
FIG. 2A
FIG. 2B

VEHICLE PROVIDED WITH A SECURITY SYSTEM FOR THERMAL RUNAWAY

CROSS-REFERENCE TO RELATED APPLICATIONS

This Patent Application claims priority from Italian Patent Application No. 102019000003499 filed on Mar. 11, 2019, the entire disclosure of which is incorporated herein by reference.

STATEMENT RE: FEDERALLY SPONSORED RESEARCH/DEVELOPMENT

Not Applicable

TECHNICAL FIELD

The invention relates to a vehicle equipped with electrochemical energy storage systems (electric batteries), which can be subjected to thermal runway phenomena, in particular to an electric vehicle for public transportation, which is provided with said batteries housed in a suitable compartment and is provided with a security system to counter the thermal runway phenomenon.

KNOWN STATE OF THE ART

As it is known, terrestrial or marine vehicles can comprise battery packs configured to supply a sufficient amount of power needed for the drive of the vehicle and for the operation of other auxiliary comfort devices, such as the air conditioning system, and functional devices, such as screens to display information that can be useful for the passengers.

As it is known, the electric batteries used in these vehicles are electrochemical storage devices, which, during use, while they are being charged and as the charge depletes, tend to heat up.

It is possible for the inner heating of the cells to reach levels that are such as to generate a phenomenon known as "thermal runaway", in which the temperature triggers exothermic reactions, which further increase the temperature, thus leading to possible disastrous consequences, such as explosions or fires.

In these cases, the battery pack needs to be quickly cooled down in order to prevent this condition from spreading to the other adjacent batteries and in order to avoid damages that are potentially lethal for the passengers of the vehicle.

This cooling operation, which requires large quantities of water or a mixture thereof with a fire extinguishing liquid, is normally carried out by having rescuers open the doors of the compartments housing the batteries and spray the fire extinguishing mixture. However, this operation is long and dangerous.

Therefore, security systems are needed, which are capable of precisely identifying the triggering of a thermal runway phenomenon in a battery pack of a vehicle and, as a consequence, allow operators to promptly and safely act so as to de-energize it through the removal of heat.

The object of the invention is to fulfil the needs discussed above.

SUMMARY OF THE INVENTION

The aforesaid object is reached by a vehicle provided with a security system according to the appended claims.

BRIEF DESCRIPTION OF THE DRAWINGS

The invention will be best understood upon perusal of the following detailed description of a preferred embodiment, which is provided by way of non-limiting example, with reference to the accompanying drawings, wherein:

FIG. 2A is a schematic perspective view showing a first embodiment of the security system according to the invention;

FIG. 2B is a schematic side view showing a first embodiment of the security system according to the invention;

DETAILED DESCRIPTION OF THE INVENTION

Figure 1:
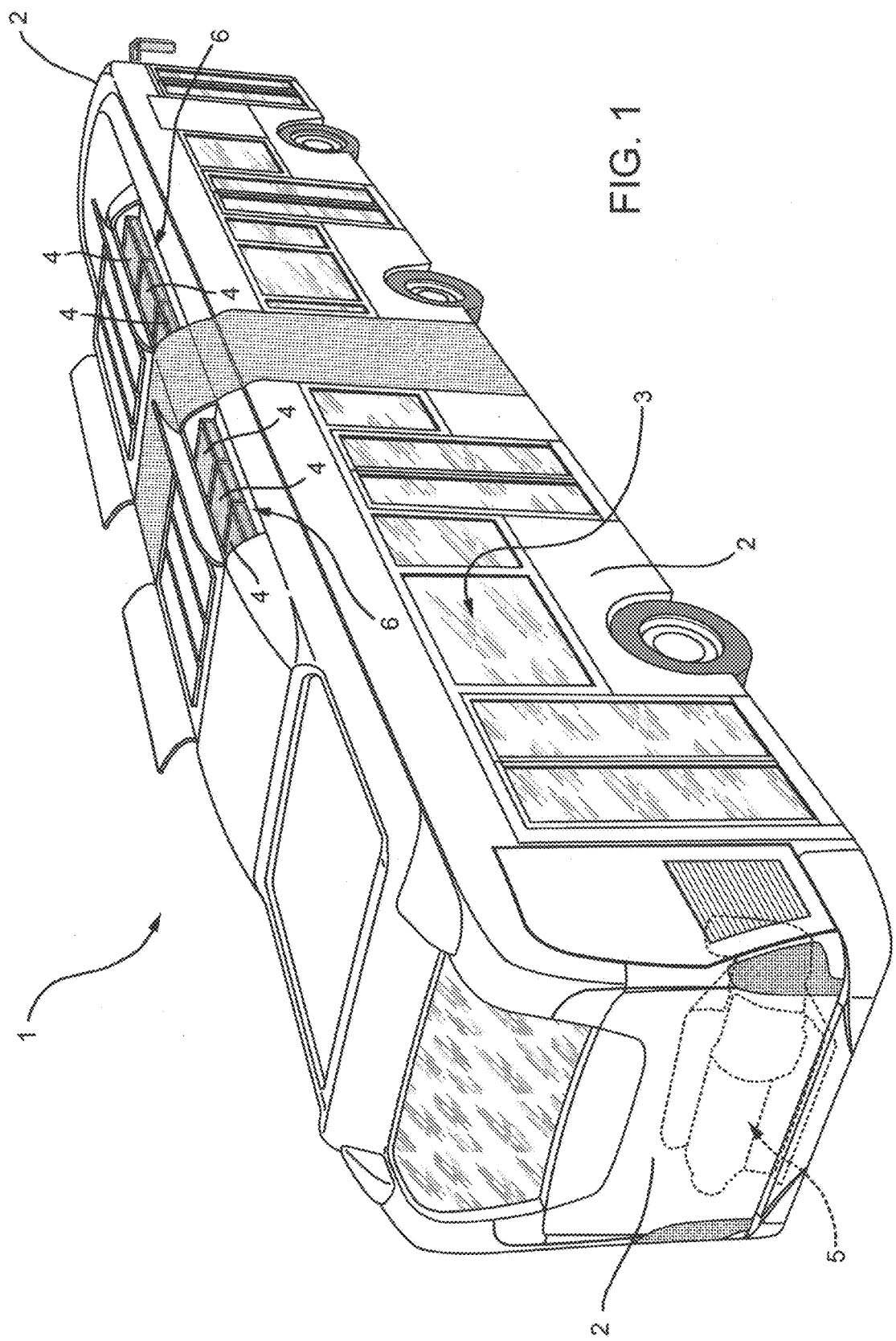
FIG. 1 is a perspective view showing an electric bus provided with a security system according to the invention.
Figure 3:
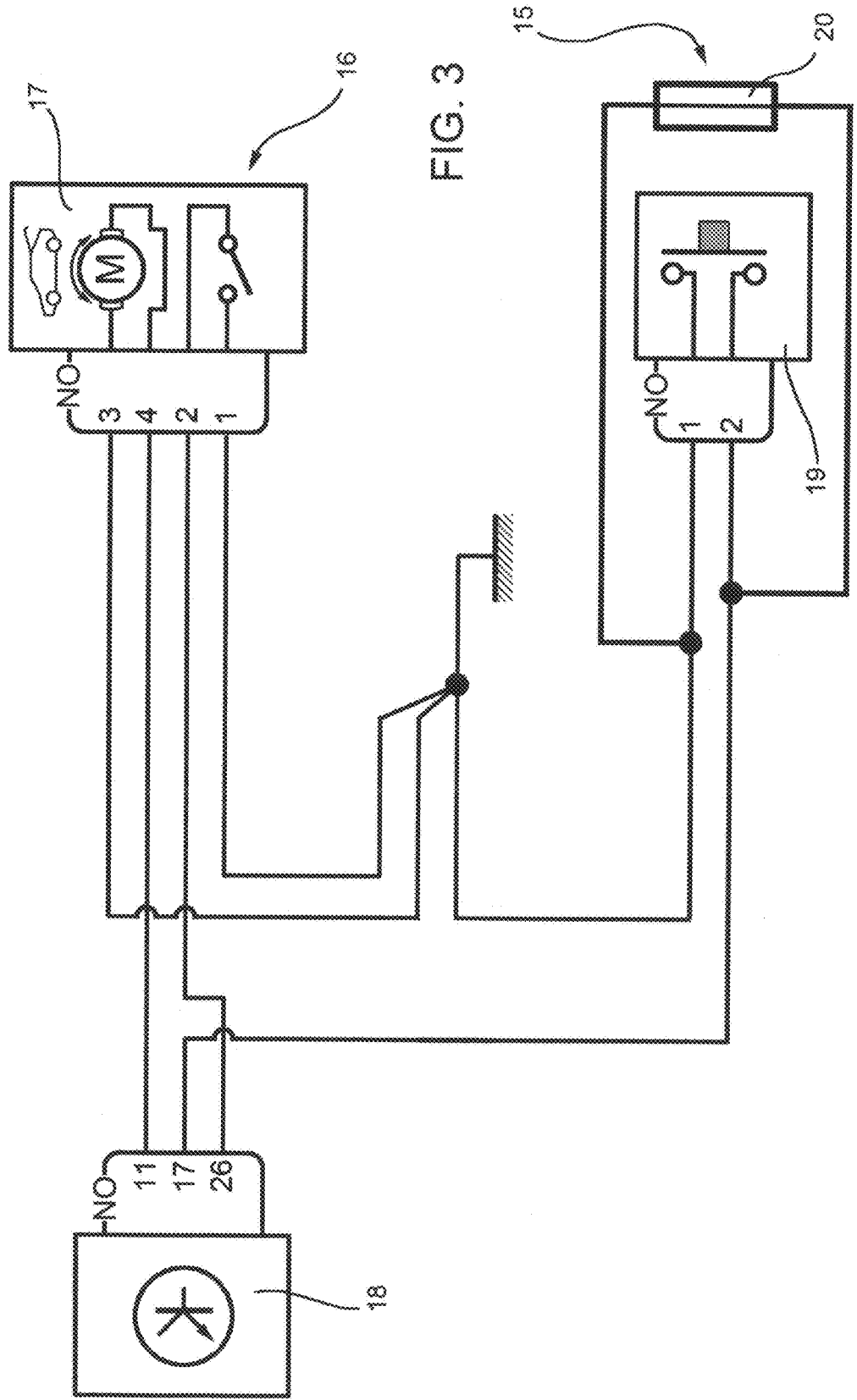
FIG. 3 is an electrical diagram of an example of an electric circuit to control the security system according to the embodiment of FIGS. 2A-2B.

FIG. 1 shows a vehicle 1 provided with a plurality of walls 2 defining an inner volume 3 designed for the transportation of passengers and/or goods and comprising a plurality of electric batteries 4, namely known electrochemical storage batteries.

In the example described herein, reference is made to a vehicle for the public transportation of people, such as a bus; however, the invention can be applied to other types of terrestrial vehicles, such as trucks, or marine vehicles, such as boats.

Hence, in the case described herein, the vehicle 1 is an electric vehicle and comprises a plurality of battery pack 4 electrically connected to an electric drive system 5 carried by the vehicle 1. As it is known, the battery packs 4 are housed in respective seats 6 obtained in a wall 2 defining the roof of the vehicle 1.

Figure 4A:
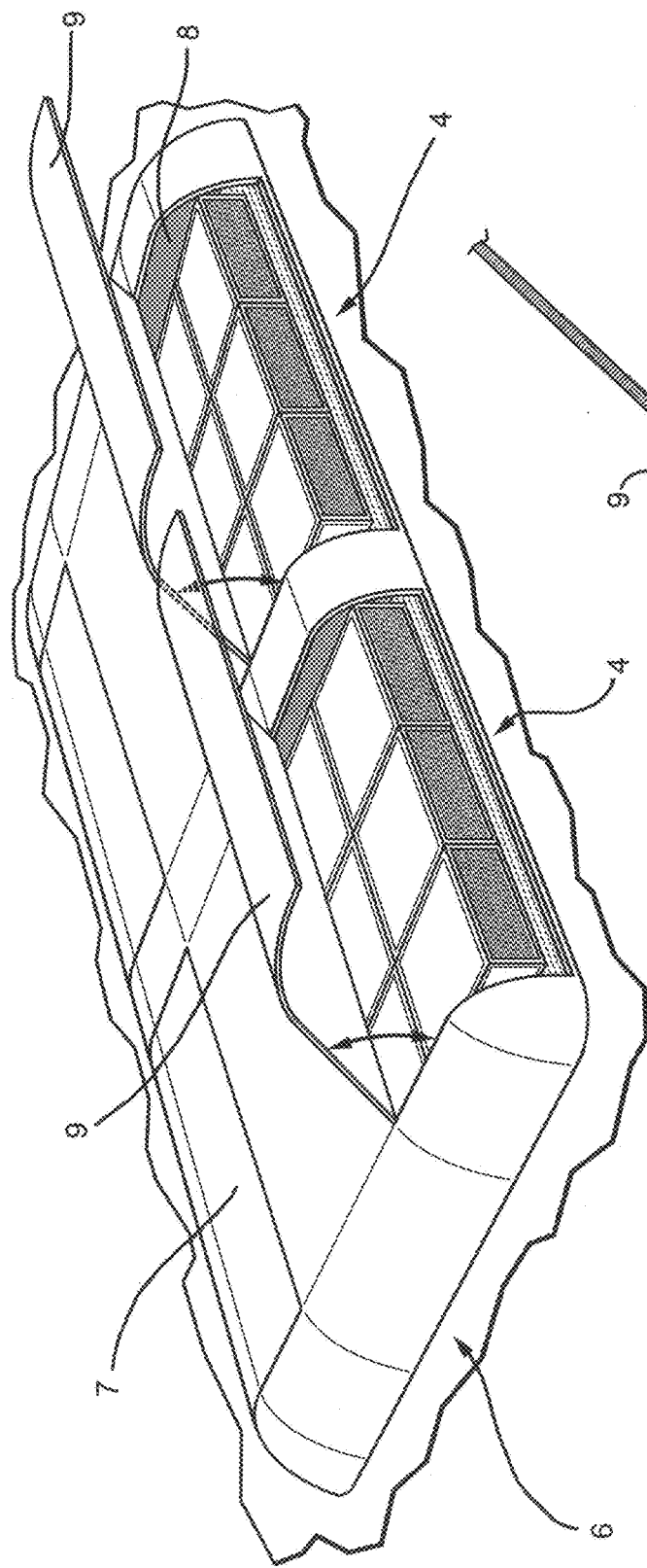
FIG. 4A is a schematic perspective view showing a second embodiment of the security system according to the invention.

In particular, with reference to FIGS. 2A and 4A, each seat 6 comprises a lid 7 defining, relative to the roof wall 2, a volume 8 housing, on the inside, at least one battery pack 4, which is separated from the surrounding environment so as to avoid water and/or dust contamination, sun radiations and accidental hits.

The lid 7 comprises covers 9, preferably one cover 9 for each battery pack 4, configured to allow the volume 8 to selectively communicate with the outside. As a consequence, each cover 9 is carried by the lid 7 in a movable manner so as to assume a closed position, in which the volume 8 is separated from the outside, and an open position, in which the volume 8 communicates with the outside.

Each cover preferably comprises isolation means (not shown), which are configured to prevent contaminating agents, such as dust or water, from reaching the inside of the volume 8, when each cover 9 is in the closed position.

In the embodiment described herein, the covers 9 are hinged relative to the lid 7 and have a shape that is such that, when they are closed, they are integrated in the lid 7.

Figure 4B:
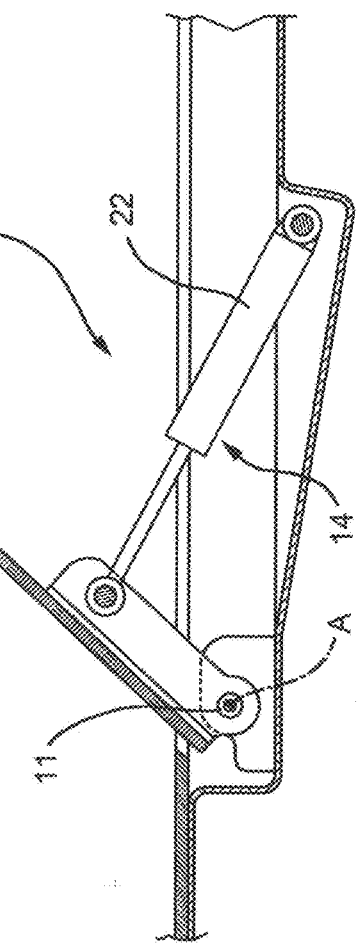
FIG. 4B is a schematic side view showing a second embodiment of the security system according to the invention.

In particular, with reference to FIGS. 2B, 4B, the covers 9 comprise an inner end, which is hinged to the lid 7 by means of a hinge 11, which is configured to allow the inner end to rotate around an axis A, which is parallel to the longitudinal axis of the vehicle.

According to the invention, between each cover 9 and the lid 11 the vehicle 1 comprises security means 13, which are configured to allow the covers 9 to be immediately opened when a threshold temperature of the battery pack 4 and/or on the inside of the volume 8 exceeds a pre-set threshold, which can be defined based on the electrochemical features of the battery. In particular, the security means 13 comprise opening means 14 for the covers 9, which are operated based on a temperature condition of the battery pack 4 and/or on the inside of the volume 8, which is identified by suitable thermosensitive devices 15. This temperature is a function of the specific thermal-chemical system of the battery pack 4 and can preferably range from 120 to 180°.

According to a first embodiment, which is shown in FIGS. 2A-2B, the opening means 14 comprise elastic means 16, for example a helical spring, which are interposed between the cover 9 and one between the lid 7 and/or the roof 2 and are configured to constantly exert a force upon the cover 9 so as to enable the opening thereof, and an electric lock 17, which is configured to keep the cover 9 closed according to a configured electronic logic. The thermosensitive devices 15 can comprise a switch, which can be switched as a function of a threshold temperature, which can be defined during the designing phase, for example 160°, in order to allow the electric lock 17 to be opened.

FIG. 4 shows an electric diagram for the control of the electric lock 17 according to a possible embodiment. The electric lock 17, which is of a known type, is connected to a management module 18 for the management thereof and to a button 19, which is configured to allow the cover 9 to be opened when it is manually operated.

According to the circuit example shown in the figure, when the button is pressed, the management module 18 orders the opening of the electric lock 17. In the example described herein, the thermosensitive devices 15 comprise a thermal fuse 20, which is arranged in parallel to the button 19 and is in a normally open configuration. If the temperature exceeds a pre-set threshold, the thermal fuse 20 switches to an open condition and the management module 18 orders the opening of the electric lock 17.

The management module 18 can advantageously be the management module of the battery pack system (BMS Battery Management System) or the electronic control unit of the vehicle (ECU).

The embodiment described above works as follows.

In a standard use condition, the electric lock 17 keeps the covers 9 in a closed position or the user, by pressing the button 19, releases the electric lock 17 and the elastic means 16 can cause the covers 9 to rotate around the hinge 11, thus allowing them to move to the open position, in which the volume 8 communicates with the outside.

In an emergency condition, the thermal fuse 20, once the pre-set temperature threshold is reached, switches, releasing the electric lock 17 so that the elastic means 16 move the covers 9 from the closed position to the open position, thus allowing an immediate cooling, thanks to the exchange of air with the outside, and, especially, allowing immediate access to rescuers with a fire extinguishing liquid suitable for the situation.

According to a second embodiment, which is shown in FIGS. 4A-4B, the opening means 14 comprise pneumatic means 22, which are interposed between the cover 9 and one between the lid 7 and/or the roof 2 and are configured to exert, when they are operated, a force upon the cover 9 so as to enable the opening thereof, and a thermal fuse module 23, which operates the pneumatic means 22 as a function of a threshold temperature, for example 140°.

The pneumatic means 22 can advantageously comprise a solenoid valve 24, which is fluidically connected to a source of pressurised fluid, for example air, of the vehicle 1 and are controlled by a management module (not shown) to open or close the cover 9 when the user needs it. Again, the management module can be the management module of the battery pack system (BMS Battery Management System) or the electronic control unit of the vehicle (ECU).

Figure 5:
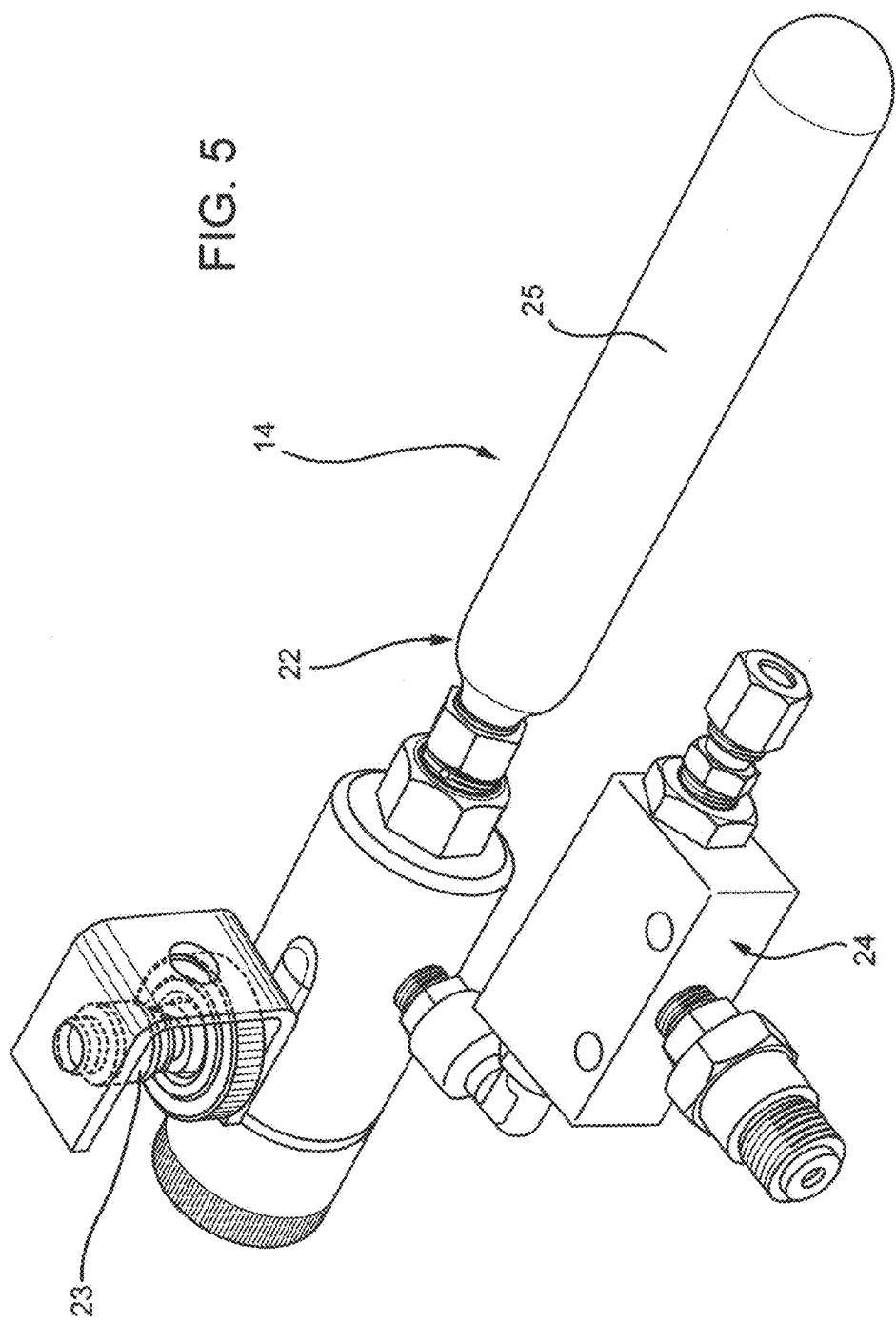
FIG. 5 is a perspective view showing an embodiment of pneumatic means to control the security system according to the embodiment of FIGS. 4A-4B.

FIG. 5 shows the pneumatic means 22 according to a possible embodiment thereof. A cylinder-type device 25 is fluidically operated by the solenoid valve 24, which, as mentioned above, is connected to a fluid source of the vehicle. The thermal fuse module 23 is fluidically connected to the solenoid valve 24 so as to allow the cylinder 25 to be operated and, at the same time, provide a sufficient source of fluid to supply said activation.

In particular, the thermal fuse module 23 can comprise a pressurised air vial, which, at a pre-set temperature, brakes, thus opening the solenoid valve 24 and providing, at the same time, a source of fluid to supply the activation of the cylinder 25. Indeed, the vial ensures the presence of compressed air even in case of absence or fault of the pneumatic system with which some types of vehicles, for instance buses, are provided.

The invention further relates to a method to control the covers 9 of the compartment 6 of a vehicle of the type described above, said method basically comprising the steps of:

identifying a threshold temperature in the volume 8 and/or in the battery pack 4 through thermosensitive devices 15;

if said temperature is smaller than a pre-set threshold value, controlling the opening means 14 so as to prevent the covers 9 from automatically moving from the first to the second operating condition;

in the opposite case, controlling the opening means 14 are controlled so as to allow the covers 9 to automatically move from the first to the second operating condition.

Owing to the above, the advantages of a vehicle 1 provided with a security system 13 for thermal runaway phenomena according to the invention are evident.

In particular, thanks to the security means 13, the covers 9 can be automatically opened based on a pre-set security temperature, thus allowing users to promptly lower the temperature of the battery pack.

The use of electric-mechanical means 13 of the type described in the first embodiment allows the control of said temperature to be carried out in an economic fashion and to be integrated in the already existing battery/vehicle management system module.

The use of pneumatic security modules 13 exploits a pressurised fluid source already existing in the vehicle, without having to use electronic elements, which could be subjected to damages in case of high temperatures, thus jeopardizing the correct operation thereof.

Finally, the vehicle 1 provided with a security system 13 for thermal runaway phenomena according to the invention can be subjected to changes and variants, which, though, do not go beyond the scope of protection set forth in the appended claims.

For example, the two embodiments described herein are mere examples of different equivalent electric-mechanical or pneumatic systems for controlling the opening of the covers 9.

Indeed, it is clear that, through the cover control method claimed herein, the security means 13 could be of any type, provided that they can carry out the steps of the aforesaid method.

In particular the control circuit of the electric lock 17 or the elements present in it, such as the button 19, could be different or absent.

Furthermore, the cylinder system 25 or the solenoid vale 24 or the thermal fuse module 23 could be obtained by means of equivalent devices.

What is claimed is:

1. A vehicle (1) comprising a plurality of walls (2) defining a volume (3) adapted to house passengers and/or merchandise and at least one electric battery pack (4) to supply energy for the operation of said vehicle (1), said at least one electric battery pack (4) being housed in a respective seat (6) made in at least one of said walls (2), said seat (6) defining with the latter a volume (8), for housing said at least one electric battery pack (4) and comprising at least one cover (9) configured to assume a first operating position in which the volume (8) communicates with the outside environment and a second operating position in which the volume (8) is isolated from the outside environment, said vehicle (1) comprising security means (13) configured to enable said cover (9) to move from the second operating position to the first operating position when a temperature of said at least one electric battery pack (4) and/or a temperature inside said volume (8) exceed/s a pre-set threshold temperature value.

2. The vehicle according to claim 1, wherein said security means (13) comprise opening means (14) for said covers (9) and thermosensitive devices (15) configured to identify said threshold temperature value and subsequently drive said cover (9) to move from the first to the second operating position.

3. The vehicle according to claim 1, wherein said threshold temperature value ranges between 120° and 180°.

4. The vehicle according to claim 2, wherein said opening means (14) comprise elastic means (16) and an electric lock (17), said elastic means (16) constantly exerting an opening force towards said cover (9) and said electric lock (17) being configured to be released as a function of said threshold temperature value and consequently enabling said cover (9) to move from the first to the second operating position.

5. The vehicle according to claim 4, wherein said thermosensitive devices (15) comprise a thermal fuse (20) configured to switch a state as a function of said threshold temperature value and release said electric lock (17).

6. The vehicle according to claim 5, wherein said cover (9) comprises a button (19) electrically connected to an electronic control unit (18) electronically connected to said electric lock (17) for controlling the release thereof, said thermal fuse being connected to said electronic control unit (18) in parallel with respect to said button (19).

7. The vehicle according to claim 2, wherein said opening means (14) comprise pneumatic means (22).

8. The vehicle according to claim 7, wherein said pneumatic means (22) comprise a valve (24) fluidically connected to a pressurised fluid source of said vehicle and to a cylinder (25) configured to lift said cover (9) as a function of an opening state of said valve (24).

9. The vehicle according to claim 7, wherein said thermosensitive devices (15) comprise a thermal fuse module (23) fluidically connected to said valve (24), said thermal fuse module (23) comprising a pressured fluid reserve for actuating said pneumatic means (22) and being configured to release said fluid and open said valve (24) as a function of said threshold temperature value.

10. A method for controlling covers (9) of a compartment (6) of a vehicle (1) according to claim 1 comprising the steps of:
- identifying a threshold temperature in said volume (8) and/or in said battery pack (4) through thermosensitive devices (15);
- if said temperature is less than a pre-set threshold value, control opening means (14) so as to hinder the automatic movement of said covers (9) from said first to said second operating condition;
- contrariwise, said opening means (14) are controlled to enable the automatic movement of said covers (9) from said first to said second operating condition.

* * * * *